(12) United States Patent
Dole (10) Patent No.: US 7,144,047 B2
(45) Date of Patent: Dec. 5, 2006

(54) FLEXIBLE PIPE COUPLING (75) Inventor: Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 10/734,040

(22) Filed: Dec. 10, 2003

(65) Prior Publication Data

US 2005/0127666 A1 Jun. 16, 2005

(51) Int. Cl.
*F16L 21/00* (2006.01)
(52) U.S. Cl. ..................... 285/233; 285/373; 285/367
(58) Field of Classification Search ............. 285/144.1, 285/148.1, 148.3, 66, 70, 98, 223, 233, 280, 285/298, 368, 367, 373
See application file for complete search history.

(56) References Cited

U.S. PATENT DOCUMENTS

| | | | |
|---|---|---|---|
| 2,387,410 A | 10/1945 | Roe | |
| 3,540,758 A * | 11/1970 | Torres | 285/233 |
| 3,610,654 A * | 10/1971 | Torres | 285/233 |
| 3,695,636 A * | 10/1972 | Graves | 285/233 |
| 3,776,579 A | 12/1973 | Gale | |
| 3,787,079 A * | 1/1974 | Yorke et al. | 285/233 |
| 4,008,937 A * | 2/1977 | Filippi | 285/233 |
| 4,249,786 A * | 2/1981 | Mahoff | 285/233 |
| 4,252,349 A * | 2/1981 | Mahoff | 285/233 |
| 4,496,176 A | 1/1985 | Weinhold | |
| 4,621,840 A * | 11/1986 | Foster | 285/233 |
| 4,643,464 A * | 2/1987 | Weinhold | 285/233 |
| 4,655,481 A | 4/1987 | Prueter | |
| 4,881,760 A * | 11/1989 | Runkles et al. | 285/373 |
| 4,900,070 A * | 2/1990 | Runkles et al. | 285/233 |
| 5,011,196 A | 4/1991 | Sabatier et al. | |
| 5,188,400 A * | 2/1993 | Riley et al. | 285/233 |
| 5,560,656 A | 10/1996 | Okamura et al. | |
| 5,620,210 A * | 4/1997 | Eyster et al. | 285/373 |
| 6,481,762 B1 | 11/2002 | Rex et al. | |
| 6,880,859 B1 * | 4/2005 | Breay et al. | 285/363 |

* cited by examiner

*Primary Examiner*—Aaron Dunwoody
(74) *Attorney, Agent, or Firm*—Synnestvedt & Lechner LLP (57) ABSTRACT

A mechanical pipe coupling permitting relative axial, torsional and angular deflections between pipes joined together by the coupling is disclosed. Rings, each having a greater outer diameter than the pipe, are attached to each end of the pipes to be joined. Each ring has a circumferential groove that receives an O-ring seal. A band is positioned coaxially around the rings. The band has an inwardly facing surface that sealingly engages the O-rings. A housing is clamped around the rings and the band. The housing has rims radially extending in spaced relationship to the pipes but engage the pipes when they deflect to maintain a radial separation between the housing and the band, allowing the band to float on the O-rings and maintain a fluid tight seal. The housing has inwardly facing shoulders that engage the rings and limit the axial and angular displacement of the pipes within the housing.

14 Claims, 6 Drawing Sheets

FLEXIBLE PIPE COUPLING

FIELD OF THE INVENTION

This invention concerns mechanical pipe couplings for joining pipes together, and especially couplings allowing axial, torsional and angular flexibility between the pipes.

BACKGROUND OF THE INVENTION

Piping networks for conveying fluids (liquids, gases, powders, slurries, sludges and the like) are used in a wide spectrum of industries including the petroleum industry, the chemical industry, mining, construction, manufacturing, as well as in municipal water service. It is advantageous to assemble piping networks using pipe segments sealingly joined to one another with mechanical fittings. Mechanical fittings typically comprise couplings that engage the pipe ends and are held together by removable fasteners.

Mechanical fittings are advantageous because they avoid the use of open flame or electrical arc, as required in welding, to effect a fluid tight joint between pipe ends. The assembly of mechanical fittings requires less skill than welded or brazed joints, and they are, therefore, less expensive to fabricate. Mechanical fittings also provide greater versatility for modification or repair of the piping network since repairs can be effected or new sections can be added by simply unbolting existing couplings and making the new connections as desired.

A problem common to all piping networks, regardless of how the pipes are connected, is the lack of joint flexibility axially (lengthwise along the pipe), torsionally (rotation about the long axis of the pipe) and angularly (the relative angle between one pipe and another to which it is connected). Rigid joints mean that the tolerances to which the pipes are cut and the angles at which they are joined must be maintained within relatively close limits so that the piping network will fit together as designed, without significant deviation from the plan. It is expensive and not always possible to maintain the necessary tight tolerances on pipe lengths, especially when the networks are assembled in the field as opposed to in a workshop where conditions for cutting and assembly are under greater control.

Flexible pipe joints are also advantageous for piping networks that must expand or contract and yet maintain fluid-tight connections. In one example, a piping network for the pneumatic transport of pulverized coal from the coal crushing station to the furnace in a power plant must have enough flexibility to maintain its connection to the furnace, which expands in size when in operation due to the heat generated when the coal is burned.

Furthermore, pipes in a chemical plant or refinery, for example, that carry fluids that are hotter or colder than ambient conditions, are subject to cycles of heating and cooling, and the associated changes in length that such cycles occasion. These piping networks typically require multiple expansion joints or loops to avoid over-stressing the pipes due to expansion and contraction, especially for long pipe runs. Pipes joined by flexible couplings readily accommodate the deflections due to thermal expansion and contraction and thereby eliminate the need for special expansion joints or loops in the network.

Piping networks may also be subject to significant motion, for example, when built over seismically active regions of the earth. Deflections of pipes during tremors and minor earthquakes may be accommodated by flexible couplings that maintain the fluid integrity of the joints.

There is clearly a need for pipe couplings which provide a degree of flexibility to the joints of a piping network that will enable the network to be assembled in the field, according to design, without maintaining close tolerances or the need for modifications that deviate from the plan substantially, and accommodate thermal expansion and contraction as well as other deflections without compromising the integrity of the joints.

SUMMARY OF THE INVENTION

The invention concerns a coupling assembly for flexibly and sealingly joining pipes to one another end to end and permitting axial, angular and torsional deflections between them. The coupling assembly comprises a first ring attachable to one of the pipe ends. The first ring has an outer diameter greater than the pipe and an outwardly facing circumferential groove. A first sealing member is positionable within the groove of the first ring. The first sealing member extends circumferentially around the first ring. A second ring is attachable to another of the pipe ends to be joined. The second ring has an outer diameter greater than the pipe and an outwardly facing circumferential groove. A second sealing member is positionable within the groove of the second ring and extends circumferentially around the second ring. A band is positionable in overlying relation with and surrounding the first and second rings. The band has an inwardly facing surface sealingly engageable with the first and second sealing members. A housing is positionable in overlying relation with and surrounding the rings and the band. The housing is radially spaced apart from the band allowing the band to float on the sealing members. The housing has a pair of circumferential rims positioned in longitudinally spaced apart relation to one another. Each rim is sized and toleranced to maintain the aforementioned spaced relation between the housing and the band. The housing also has a pair shoulders positioned in spaced apart relation and facing one another. Each shoulder is engageable with one of the rings for limiting axial and angular deflection of one pipe relative to the other.

The invention also includes a method of sealingly and flexibly attaching pipes to one another end to end. The method comprises the steps of:

(A) attaching a first ring to one pipe end, the first ring having an outwardly facing circumferential groove therein;

(B) attaching a second ring to another pipe end, the second ring also having an outwardly facing circumferential groove therein;

(C) inserting the first ring through a circumferentially extending band such that the band does not overlie the circumferential groove in the ring;

(D) positioning a first sealing member within the groove of the first ring;

(E) positioning a second sealing member within the groove of the second ring;

(F) bringing the first and second rings adjacent to one another in co-axial alignment;

(G) sliding the band circumferentially around the rings, the band having an inwardly facing surface sealingly engaging the first and second sealing members; and (H) positioning a housing circumferentially around and in spaced relation to the band and the rings, the housing having shoulders in spaced relation and facing one another, the shoulders being engageable with the rings to limit axial and angular deflection of the pipes relative to one another.

DETAILED DESCRIPTION OF THE EMBODIMENTS

Figure 1:
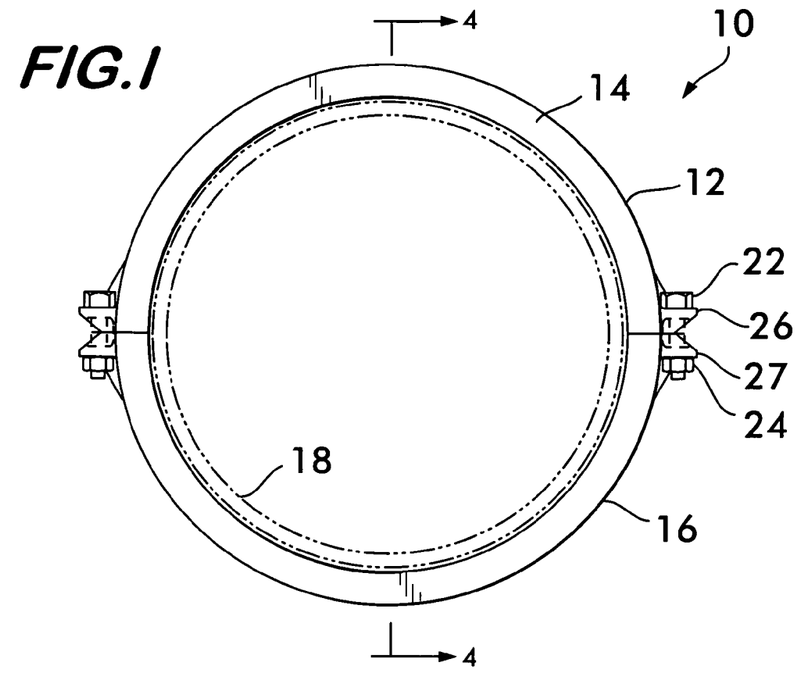
FIG. 1 is an end view of a coupling according to the invention.
Figure 2:
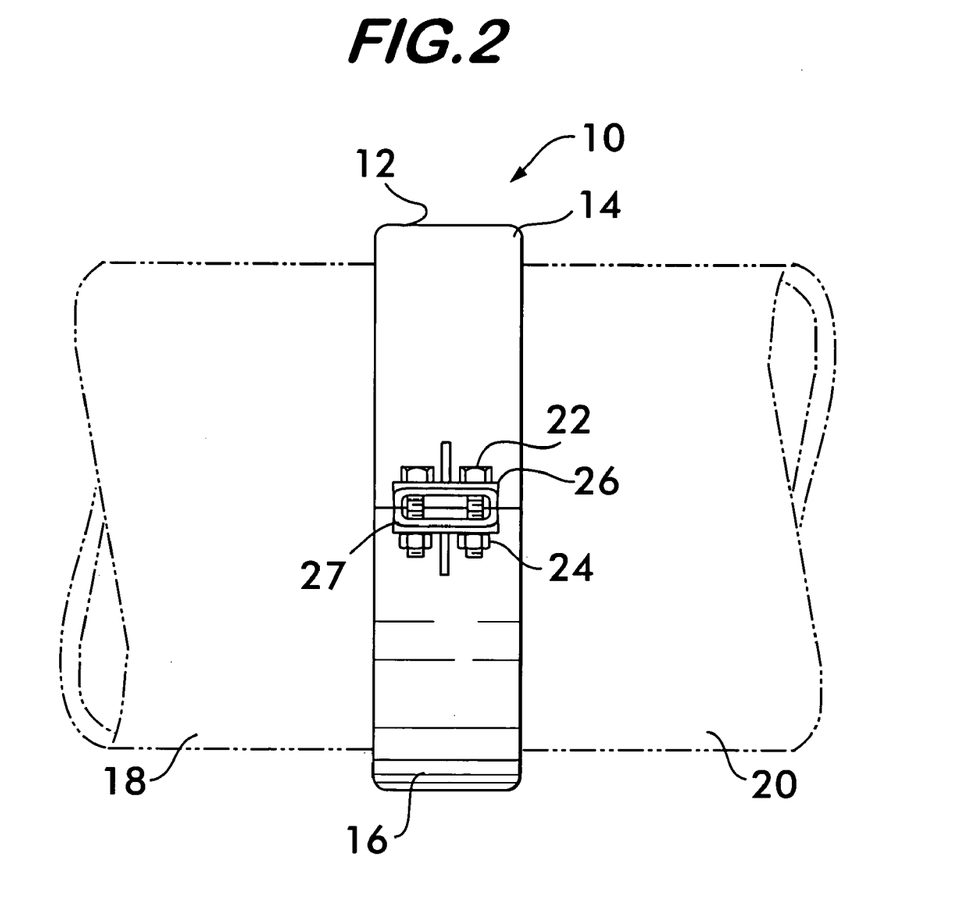
FIG. 2 is a side view of the coupling shown in FIG. 1.
Figure 3:
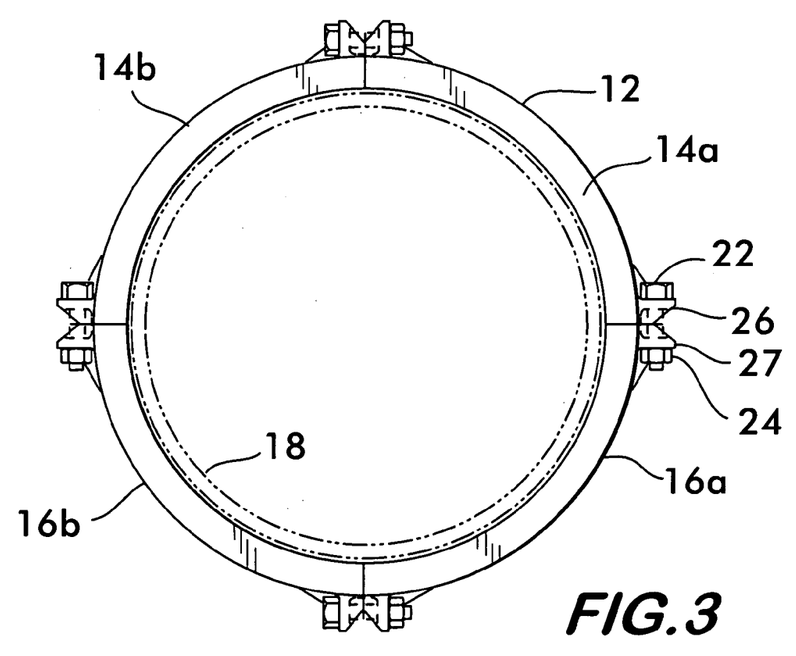
FIG. 3 is an end view of another embodiment of the coupling according to the invention.

FIGS. 1 and 2 show the mechanical pipe coupling 10 according to the invention. Preferably, the coupling 10 has a housing 12 formed of a plurality of housing portions 14 and 16 attached to one another end to end to surround and engage the ends of pipes 18 and 20, shown in phantom line. The housing portions 14 and 16 are attached to each other using fasteners such as bolts 22 and nuts 24 that bear against lugs 26 and 27 that extend outwardly from each housing portion 14 and 16 respectively. The fasteners 22, 24 clamp the lugs 26 and 27 to one another in what is called "pad-to-pad engagement" to hold the housing portions end to end around the pipes 18 and 20. The bolted attachment is advantageous because it allows the coupling to be easily disassembled for repair or modification. FIG. 3 illustrates an alternate embodiment of the housing 12 having four housing portions 14a, 14b, 16a and 16b attached end to end by fasteners 22, 24.

Figure 4:
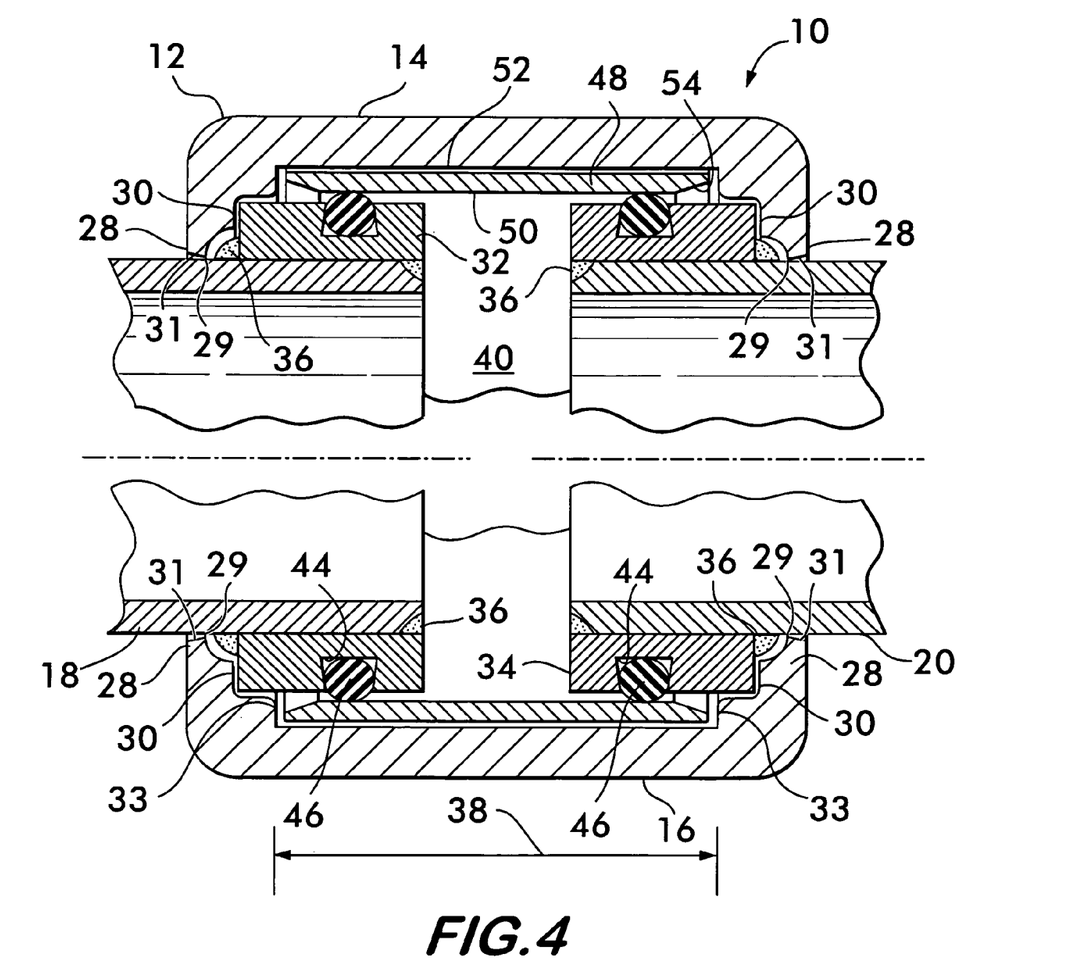
FIG. 4 is a cross-sectional view of the coupling taken at line 4—4 of FIG. 1.

FIG. 4 shows the coupling 10 in cross section. Housing portions 14 and 16 each have a pair of rims 28 positioned in longitudinally spaced apart relation to one another lengthwise along the housing 12. Rims 28 extend radially inwardly and are sized and held to tolerances so as to maintain a separation 29 between themselves and the pipes 18 and 20. The separation 29 is made possible by the pad-to-pad engagement of lugs 26 and 27 which holds the rims 28 at a diameter slightly greater than the outer diameter of pipes 18 and 20 and thereby permits relative axial, torsional and angular deflections between the pipes. Preferably the radial faces 31 of rims 28 are angled outwardly so as to further facilitate angular pipe deflections. The rims 28 are also sized so that, during any deflection between the pipes, contact that does occur between the housing portions 14 and 16 and the pipes 18 and 20 is made between the rims 28 and the pipes, and not between other portions of the housing 12 and other components comprising the coupling 10 as described below.

Each housing portion 14 and 16 also has a pair of shoulders 30, also positioned in longitudinally spaced apart relation to one another. Shoulders 30 face each other and engage other components of the coupling to limit axial and angular displacement of the pipes 18 and 20 as described below.

Figure 4A:
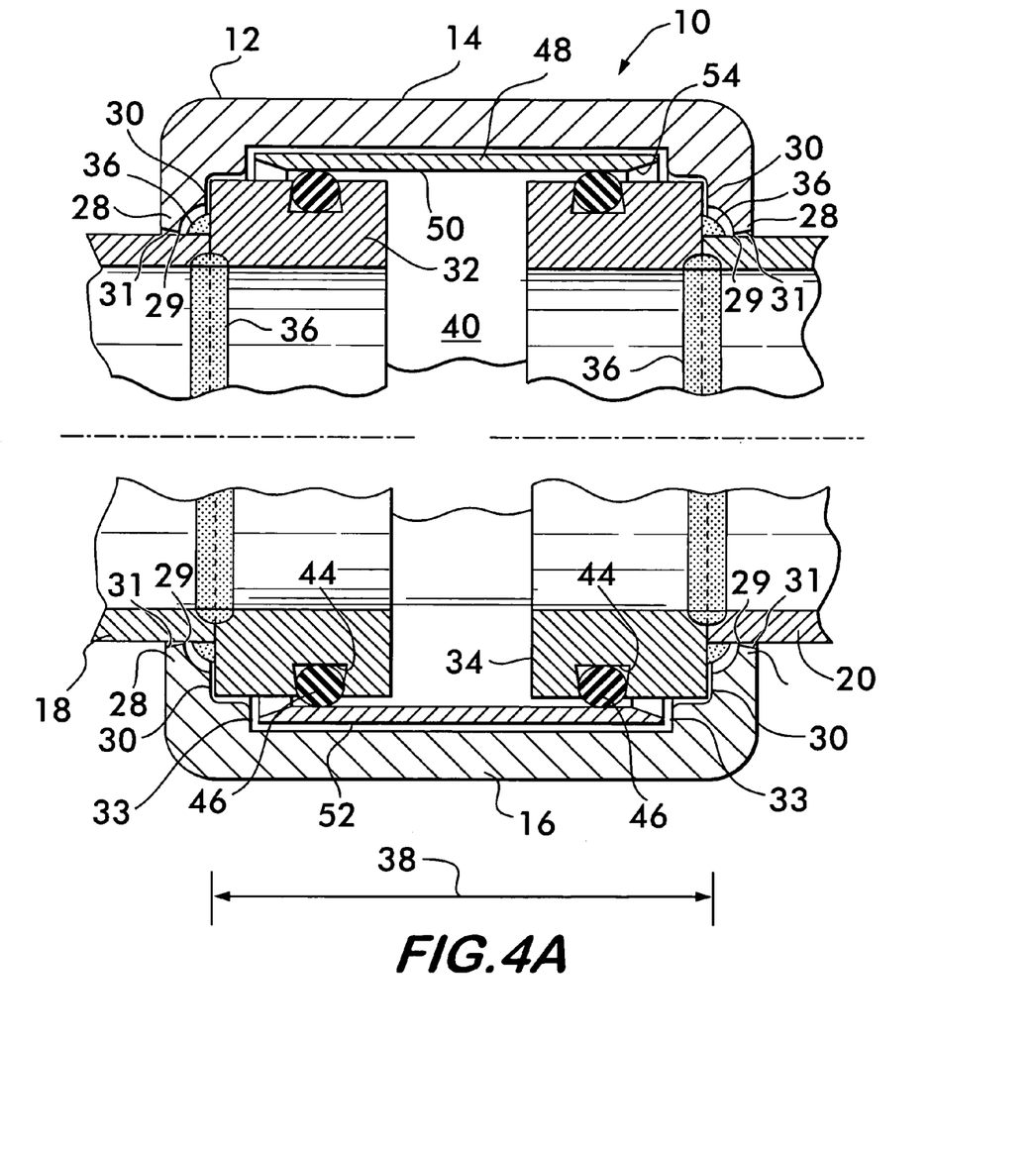
FIG. 4A is a cross-sectional view of another embodiment of the coupling according to the invention.
Figure 5:
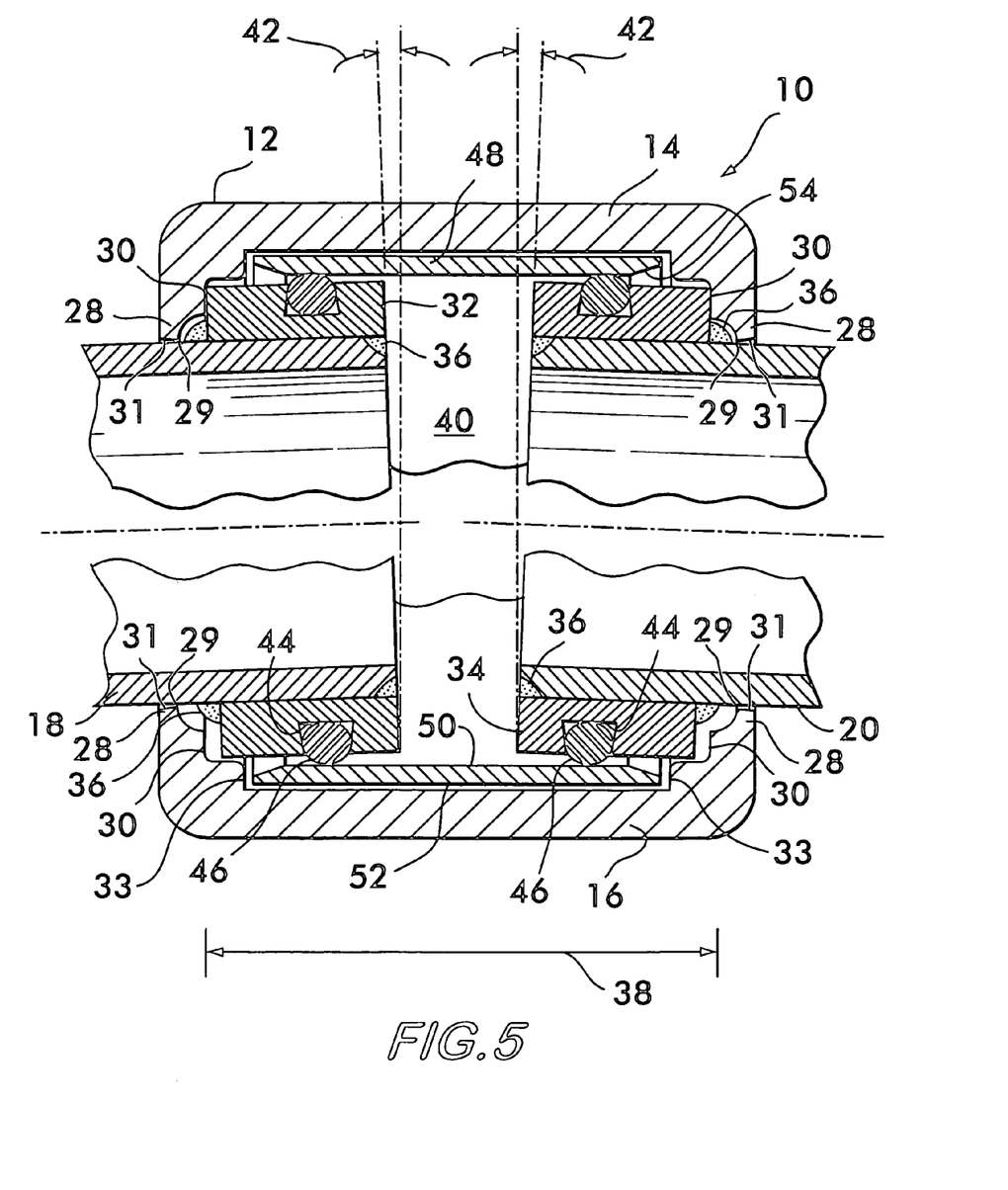
FIG. 5 is a cross-sectional view of the coupling illustrating angular displacements of the pipe ends permitted by the coupling according to the invention.

As further shown in FIG. 4, each pipe 18 and 20 has a respective ring 32 and 34 attached at or near its end. Rings 32 and 34 are preferably co-axially mounted on the pipe ends 18 and 20 and held in place by welds 36. Alternatively, as shown in FIG. 4A, rings 32 and 34 may be butt welded to the ends of the pipes 18 and 20. Referring again to FIG. 4, rings 32 and 34 have larger outer diameters than the pipes 18 and 20 to which they are attached and engage the shoulders 30 on housing portions 14 and 16. The housing portions 14 and 16 have sufficient length 38 between shoulders 30 to accommodate the rings 32 and 34 with a gap 40 between the ends of pipes 18 and 20. Gap 40 allows for axial deflection of the pipes 18 and 20 relative to one another, and the engagement of the rings 32 and 34 with shoulders 30 limits the range of this deflection and holds the ends of pipes 18 and 20 within the housing 12. As shown in FIG. 5, the relative deflection of the pipes 18 and 20 can manifest itself in an angular displacement 42 between them. This occurs when one side of the pipe moves outwardly toward the shoulder 30 while the opposite side of the pipe moves inwardly away from the shoulder. It is preferred to size the rings 32 and 34 and the spacing between the shoulders 30 so as to limit the maximum angular deflection 42 to between 2° and 4° depending upon the application to which the piping network is dedicated. This preferred range of angular displacement, along with the permitted axial and torsional deflections, ensure that the joints created by the coupling 10 are flexible enough to compensate for motion of the piping network due to thermally related expansion and contraction, motion induced by limited seismic activity, as well as to compensate for the typical tolerances encountered during network fabrication, and yet are not too flexible so as to compromise the fluid integrity of the joints formed by the couplings.

As shown in FIGS. 4 and 5, each ring 32 and 34 has an outwardly facing circumferential groove 44 that receives a sealing member, such as an O-ring 46. To effect a seal that is independent of the housing 12, a band 48 is positioned in spaced relation radially away from housing portions 14 and 16. Band 48 surrounds the rings 32 and 34 and has an inwardly facing surface 50 that sealingly engages the O-rings 46 to effect a fluid tight seal around the ends of pipes 18 and 20. The pad-to-pad engagement of lugs 26 and 27 ensures that a radial separation 52 is maintained between the band 48 and the housing portions 14 and 16. Radial separation 52 allows band 48 to float on the O-rings 46 and maintain concentricity with the pipes 18 and 20. By remaining substantially concentric, band 48 maintains substantially equal pressure circumferentially around the O-rings 46 and thus ensures a fluid tight seal at the joint formed by coupling 10 despite the permitted axial and angular displacement of pipes 18 and 20. Housing portions 14 and 16 have a second pair of shoulders 33. Shoulders 33 are positioned on opposite sides of band 48 to engage the band edges and help maintain its engagement with O-rings 46 to ensure the fluid tightness of the joint. The separation 29 between rims 28 and pipes 18 and 20 is controlled relative to the radial separation 52 between housing portions 14 and 16 and band 48 such that if contact occurs, it occurs first between the rims 28 and the pipes 18 and 20, thereby preventing further contact between the housing portions 14 and 16 and band 48.

Figure 6:
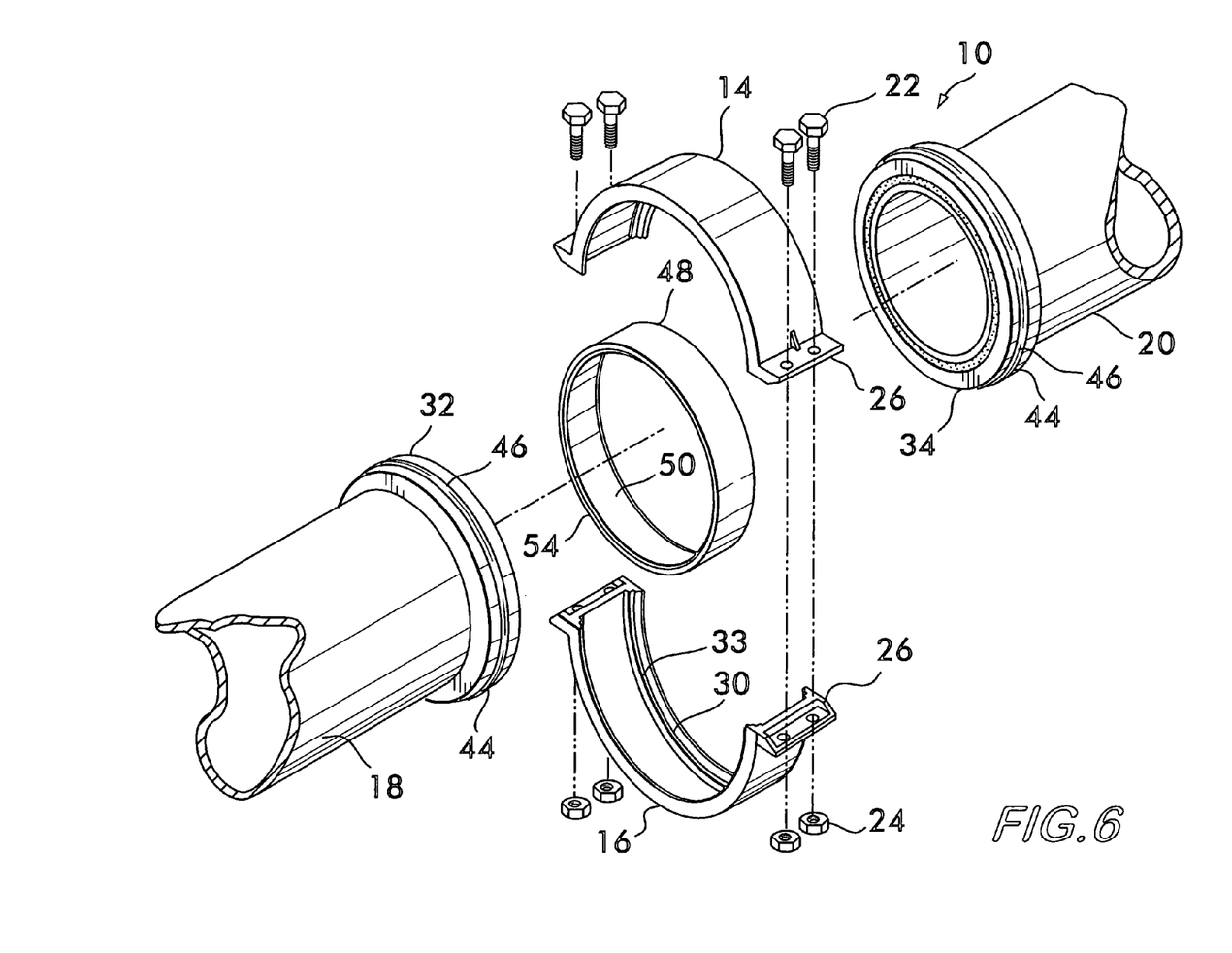
FIG. 6 is an exploded view of the pipe coupling assembly according to the invention.

Assembly of the coupling 10 according to the invention is illustrated in FIG. 6. Rings 32 and 34 are welded onto ends of pipes 18 and 20, respectively. Next the ring 32 is passed through the band 48, the band being positioned such that it does not overlie the circumferential groove 44. O-ring sealing members 46 are then positioned within grooves 44, and the pipes 18 and 20 are positioned adjacent to one another in coaxial alignment. Band 48 is then drawn from ring 32 toward ring 34, the inwardly facing surface 50 sealingly engaging the O-rings 46 on each ring. Housing portions 14 and 16 are next positioned around band 48 and rings 32 and 34 and attached to one another end to end using bolts 22 and nuts 24 to bring lugs 26 and 27 into pad-to-pad engagement.

Flexible pipe couplings according to the invention allow piping networks to be assembled that are sufficiently flexible to accommodate significant thermally induced deflections, motion due to seismic forces as well as deviations in dimensions due to accumulation of tolerance errors without compromising the integrity of the joints formed between the pipe segments.

What is claimed is:

1. A coupling assembly for flexibly joining pipes to one another end to end and permitting relative axial, torsional and angular deflection between said pipes, said coupling assembly comprising:
   a first ring attachable to an end of one of said pipes, said first ring having an outer diameter greater than said pipe and an outwardly facing circumferential groove therein;
   a first sealing member positionable within said groove of said first ring and extending circumferentially therearound;
   a second ring attachable to an end of another of said pipes, said second ring having an outer diameter greater than said other pipe and an outwardly facing circumferential groove therein;
   a second sealing member positionable within said groove of said second ring and extending circumferentially therearound;
   a band positionable in overlying relation with and surrounding said first and second rings, said band having an inwardly facing surface sealingly engageable with said first and second sealing members and having a width sufficient to allow a gap between said pipes;
   a housing positionable in overlying relation with and surrounding said rings and radially spaced apart from said band, said housing having a pair of first shoulders positioned in spaced apart relation, each said first shoulder being engageable with one of said rings for limiting axial and angular deflection of one pipe relative to the other, and a pair of second shoulders each said second shoulder being positioned on an opposite side of said band, each said second shoulder being engageable with an edge of said band for maintaining said band engaged with said sealing members; and
   a pair of circumferential rims positioned in longitudinally spaced apart relation, each said rim extending radially inwardly and being in spaced relation to said pipes, said rims being engageable with said pipes upon angular deflection thereof for maintaining said spaced relation between said housing and said band.

2. A coupling assembly according to claim 1, wherein one of said rings has an inner diameter sized to receive said pipe end in substantially coaxial engagement.

3. A coupling assembly according to claim 1, wherein said housing comprises a plurality of housing portions attachable to one another end to end to extend around said pipe ends.

4. A coupling assembly according to claim 1, wherein said first shoulders are positioned at a predetermined longitudinal distance from one another so as to engage said rings and thereby limit angular deflection between said pipes to a maximum of up to about 2°.

5. A coupling assembly according to claim 1, wherein said first shoulders are positioned at a predetermined longitudinal distance from one another so as to engage said rings and thereby limit angular deflection between said pipes to a maximum of up to about 4°.

6. A coupling assembly according to claim 1, wherein said rings are attached to said pipe ends by welding.

7. A coupling assembly according to claim 1, wherein said sealing members comprise O-rings.

8. A coupling assembly according to claim 1, wherein said band comprises a single piece.

9. A coupling flexibly joining pipes to one another end to end and permitting axial, torsional and angular deflection between said pipes, said coupling comprising:
   a first ring attached coaxially around an end of one of said pipes, said first ring having an outwardly facing circumferential groove therein;
   a first sealing member positioned within said groove of said first ring and extending circumferentially therearound;
   a second ring attached coaxially around an end of another of said pipes, said second ring having an outwardly facing circumferential groove therein;
   a second sealing member positioned within said groove of said second ring and extending circumferentially therearound;
   a band positioned coaxially surrounding said first and second rings, said band having an inwardly facing surface sealingly engaging said first and second sealing members and having a width sufficient to allow a gap between said pipes;
   a housing coaxially surrounding said rings and said band, said housing being radially spaced apart from said band and having a pair of circumferential rims positioned in longitudinally spaced apart relation, each said rim extending radially inwardly and being in spaced relation with said pipes, said rims being engageable with said pipes upon angular deflection thereof for maintaining substantially co-axial, radially spaced relation between said housing and said band, said housing having a pair of first shoulders positioned in spaced apart relation facing one another, said rings being positioned between said first shoulders, each said first shoulder being engageable with one of said rings for limiting axial and angular deflection of one pipe relative to the other, said first shoulders being positioned at a predetermined longitudinal distance from one another so as to engage said rings and thereby limit angular deflection between said pipes to a maximum of up to about 2°; and
   a pair of second shoulders, each said second shoulder being positioned in spaced apart relation on an opposite side of said band, each said second shoulder being engageable with an edge of said band for maintaining said band engaged with said sealing members.

10. A coupling assembly according to claim 9, wherein said housing comprises a plurality of housing portions attached to one another end to end to extend around said pipes.

11. A coupling according to claim 10, further comprising fasteners attaching said housing portions to one another.

12. A coupling assembly for flexibly joining pipes to one another end to end and permitting relative axial, torsional and angular deflection between said pipes, said coupling assembly comprising:
   a first ring attachable to an end of one of said pipes, said first ring having an outer diameter greater than said pipe and an outwardly facing circumferential groove therein;
   a first sealing member positionable within said groove of said first ring and extending circumferentially therearound;

a second ring attachable to an end of another of said pipes, said second ring having an outer diameter greater than said other pipe and an outwardly facing circumferential groove therein;

a second sealing member positionable within said groove of said second ring and extending circumferentially therearound;

a band positionable in overlying relation with and surrounding said first and second rings, said band having an inwardly facing surface sealingly engageable with said first and second sealing members and having a width sufficient to allow a gap between said pipes;

a housing positionable in overlying relation with and surrounding said rings and radially spaced apart from said band, said housing having a pair of first shoulders positioned in spaced apart relation, each said first shoulder being engageable with one of said rings for limiting axial and angular deflection of one pipe relative to the other, said first shoulders being positioned at a predetermined longitudinal distance from one another so as to engage said rings and thereby limit angular deflection between said pipes to a maximum of up to about 2°; and a pair of second shoulders each said second shoulder being positioned on an opposite side of said band, each said second shoulder being engageable with an edge of said band for maintaining said band engaged with said sealing members.

13. A coupling assembly for flexibly joining pipes to one another end to end and permitting relative axial, torsional and angular deflection between said pipes, said coupling assembly comprising:

a first ring attachable to an end of one of said pipes, said first ring having an outer diameter greater than said pipe and an outwardly facing circumferential groove therein;

a first sealing member positionable within said groove of said first ring and extending circumferentially therearound;

a second ring attachable to an end of another of said pipes, said second ring having an outer diameter greater than said other pipe and an outwardly facing circumferential groove therein;

a second sealing member positionable within said groove of said second ring and extending circumferentially therearound;

a band positionable in overlying relation with and surrounding said first and second rings, said band having an inwardly facing surface sealingly engageable with said first and second sealing members and having a width sufficient to allow a gap between said pipes;

a housing positionable in overlying relation with and surrounding said rings and radially spaced apart from said band, said housing having a pair of first shoulders positioned in spaced apart relation, each said first shoulder being engageable with one of said rings for limiting axial and angular deflection of one pipe relative to the other, said first shoulders being positioned at a predetermined longitudinal distance from one another so as to engage said rings and thereby limit angular deflection between said pipes to a maximum of up to about 4°; and a pair of second shoulders each said second shoulder being positioned on an opposite side of said band, each said second shoulder being engageable with an edge of said band for maintaining said band engaged with said sealing members.

14. A coupling flexibly joining pipes to one another end to end and permitting axial, torsional and angular deflection between said pipes, said coupling comprising:

a first ring attached coaxially around an end of one of said pipes, said first ring having an outwardly facing circumferential groove therein;

a first sealing member positioned within said groove of said first ring and extending circumferentially therearound;

a second ring attached coaxially around an end of another of said pipes, said second ring having an outwardly facing circumferential groove therein;

a second sealing member positioned within said groove of said second ring and extending circumferentially therearound;

a band positioned coaxially surrounding said first and second rings, said band having an inwardly facing surface sealingly engaging said first and second sealing members and having a width sufficient to allow a gap between said pipes;

a housing coaxially surrounding said rings and said band, said housing being radially spaced apart from said band and having a pair of circumferential rims positioned in longitudinally spaced apart relation, each said rim extending radially inwardly and being in spaced relation with said pipes, said rims being engageable with said pipes upon angular deflection thereof for maintaining substantially co-axial, radially spaced relation between said housing and said band, said housing having a pair of first shoulders positioned in spaced apart relation facing one another, said rings being positioned between said first shoulders, each said first shoulder being engageable with one of said rings for limiting axial and angular deflection of one pipe relative to the other, said first shoulders being positioned at a predetermined longitudinal distance from one another so as to engage said rings and thereby limit angular deflection between said pipes to a maximum of up to about 4°; and a pair of second shoulders, each said second shoulder being positioned in spaced apart relation on an opposite side of said band, each said second shoulder being engageable with an edge of said band for maintaining said band engaged with said sealing members.

* * * * *